US008843322B2

(12) United States Patent
Zrilli

(10) Patent No.: US 8,843,322 B2
(45) Date of Patent: Sep. 23, 2014

(54) METHOD AND DEVICE FOR MONITORING AN EXHAUST GAS RECIRCULATION SYSTEM AND COMPUTER PROGRAM

(75) Inventor: Tahar Zrilli, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 818 days.

(21) Appl. No.: 12/663,884

(22) PCT Filed: Jun. 10, 2008

(86) PCT No.: PCT/EP2008/057233
§ 371 (c)(1),
(2), (4) Date: Dec. 10, 2009

(87) PCT Pub. No.: WO2008/152037
PCT Pub. Date: Dec. 18, 2008

(65) Prior Publication Data
US 2010/0179769 A1   Jul. 15, 2010

(30) Foreign Application Priority Data

Jun. 12, 2007   (DE) .................. 10 2007 026 945

(51) Int. Cl.
*G01N 31/00*   (2006.01)
*F02M 25/07*   (2006.01)
*F02D 41/14*   (2006.01)
*F02D 41/00*   (2006.01)
*F02D 41/18*   (2006.01)
*F02D 13/02*   (2006.01)

(52) U.S. Cl.
CPC ....... *F02D 41/0072* (2013.01); *F02M 25/0702* (2013.01); *F02D 41/187* (2013.01); *F02D 41/146* (2013.01); *F02D 41/1459* (2013.01); *F02D 41/1448* (2013.01); *F02D 41/1462* (2013.01); *F02D 2200/0812* (2013.01); *F02D 41/1466* (2013.01); *F02M 25/0718* (2013.01); *F02D 13/0215* (2013.01); *Y02T 10/47* (2013.01)
USPC ......................................................... 702/24

(58) Field of Classification Search
CPC ............ F02D 41/0072; F02D 41/1448; F02D 41/1459; F02D 41/146; F02D 41/1466; F02D 41/1462; F02D 13/0215; F02D 41/187; F02D 2200/0812; F02M 25/0702; F02M 25/0718; Y02T 10/47
USPC .............................. 702/24; 123/58.18, 568.18
See application file for complete search history.

(56) References Cited

U.S. PATENT DOCUMENTS

| 5,209,212 | A | 5/1993 | Viess et al. ................... 123/571 |
| 2005/0098163 | A1* | 5/2005 | Andoh et al. ............. 123/568.18 |
| 2007/0125075 | A1 | 6/2007 | Zanini-Fisher et al. ........ 60/297 |
| 2007/0272211 | A1 | 11/2007 | Kassner ........................ 123/435 |

FOREIGN PATENT DOCUMENTS

| DE | 4121071 | 1/1993 | ............. F20D 45/00 |
| DE | 19719278 | 11/1998 | ............. F02D 41/14 |
| DE | 102005032623 | 6/2006 | ............. F01N 11/00 |
| DE | 102005058299 | 6/2007 | ............. F01N 11/00 |
| EP | 0791736 | 8/1997 | ............. F02D 21/08 |
| EP | 1365139 | 11/2003 | ............. F02M 25/07 |
| EP | 1541841 | 6/2005 | ............. F02D 41/22 |
| JP | 03134256 A | * 6/1991 | |
| JP | 9317568 | 12/1997 | ............. F02M 25/07 |
| WO | 2004113710 | 12/2004 | ............. F02M 25/07 |

OTHER PUBLICATIONS

International Search Report and Written Opinion for Application No. PCT/EP2008/057233 (12 pages), Nov. 10, 2008.
German Office Action for Application No. 10 2007 026 945.7 (4 pages), Mar. 6, 2008.
Report from German Patent Office, German Patent Application No. 102007026945.7, 6 pages, Oct. 1, 2012.

* cited by examiner

*Primary Examiner* — Tung S Lau
*Assistant Examiner* — Xiuqin Sun
(74) *Attorney, Agent, or Firm* — King & Spalding L.L.P.

(57) ABSTRACT

In a method and device for monitoring an exhaust gas recirculation system of an internal combustion engine, an actual value (AV_EGR) of an exhaust gas recirculation rate is determined depending on a load degree (LD) of a soot particle filter (21) for filtering particles out of an exhaust gas of the internal combustion engine and/or depending on a soot content of the exhaust gas. The actual value (AV_EGR) of the exhaust gas recirculation rate so obtained is compared with a predetermined setpoint value (SP_EGR) of the exhaust gas recirculation rate. The exhaust gas recirculation system is monitored depending on the comparison of the actual value (AV_EGR) of the exhaust gas recirculation rate and the predetermined setpoint value (SP_EGR) of the exhaust gas recirculation rate.

19 Claims, 3 Drawing Sheets

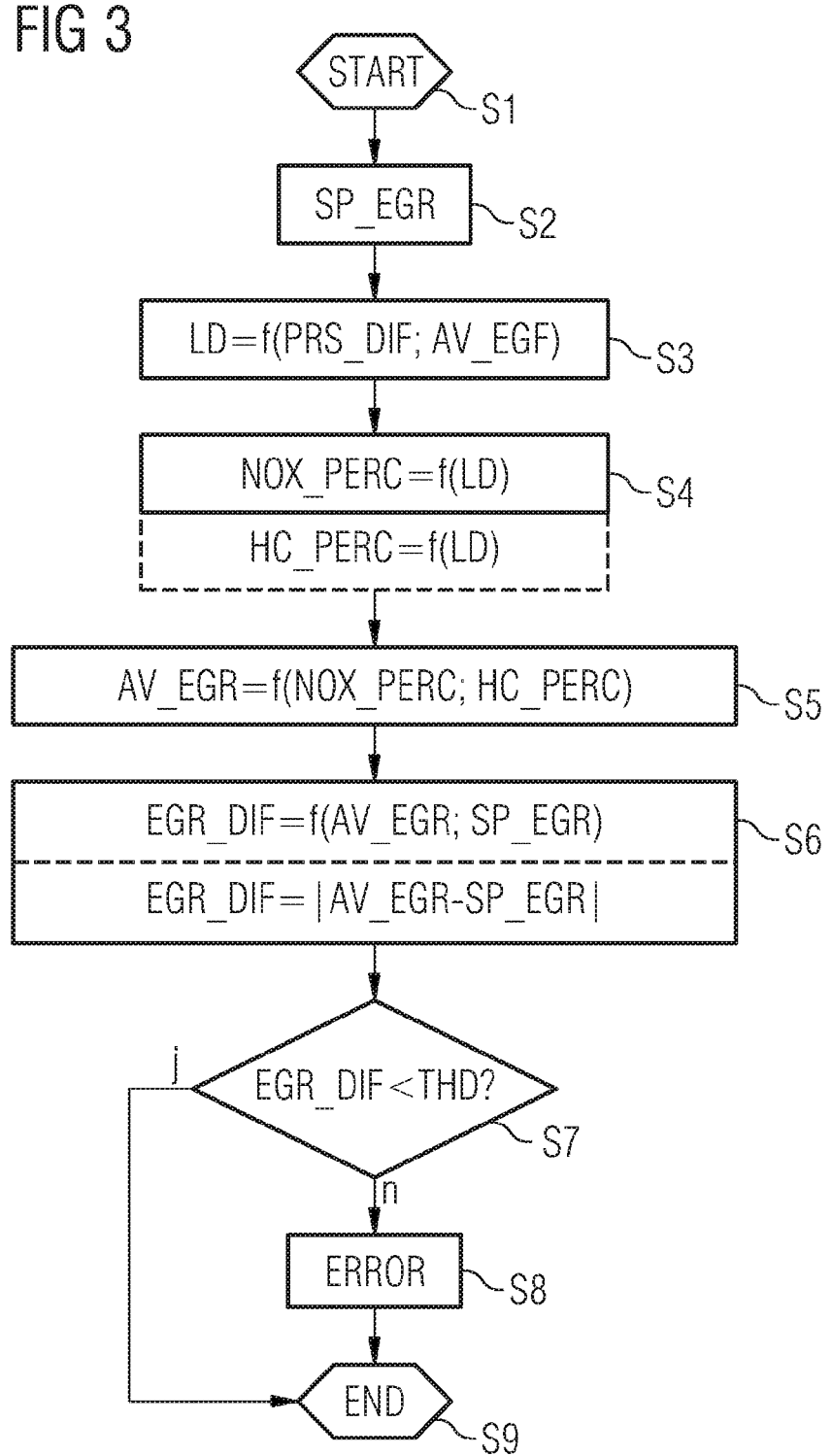

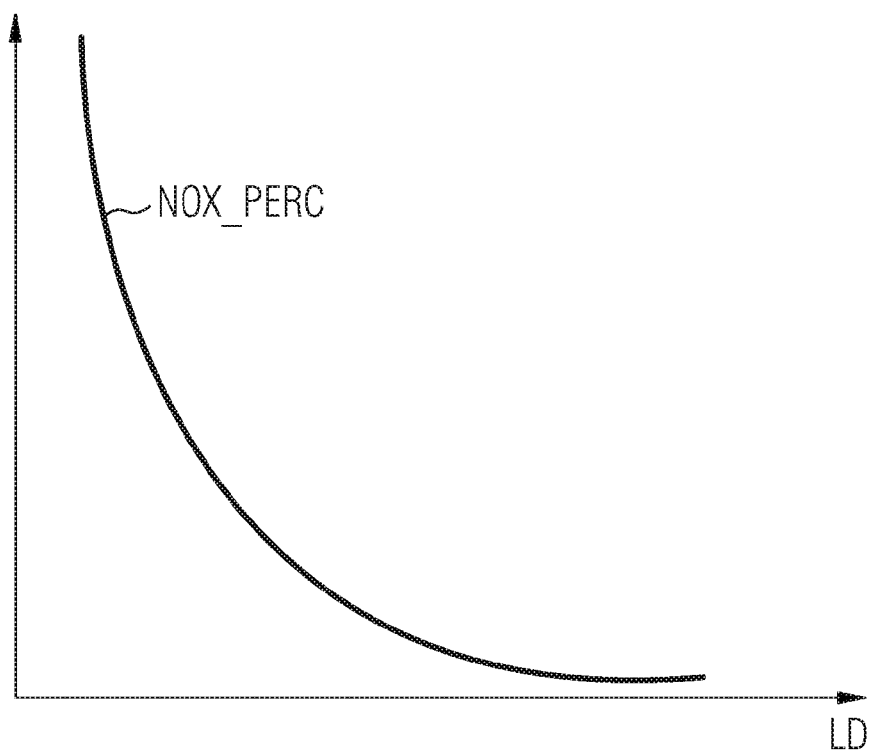

METHOD AND DEVICE FOR MONITORING AN EXHAUST GAS RECIRCULATION SYSTEM AND COMPUTER PROGRAM

CROSS-REFERENCE TO RELATED APPLICATIONS

This application is a U.S. National Stage Application of International Application No. PCT/EP2008/057233 filed Jun. 10, 2008, which designates the United States of America, and claims priority to German Application No. 10 2007 026 945.7 filed Jun. 12, 2007, the contents of which are hereby incorporated by reference in their entirety.

TECHNICAL FIELD

The invention relates to a method and device for monitoring an exhaust gas recirculation system of an internal combustion engine. The invention also relates to a computer program.

BACKGROUND

The principal pollutants produced in the case of diesel internal combustion engines are oxides of nitrogen and soot particles. The production of the nitrogen oxides is promoted by a relatively high concentration of oxygen by comparison with the fuel mass in a combustion process of the internal combustion engine. A low oxygen concentration prior to the combustion process can lead to a low oxygen concentration after the combustion process in an exhaust gas of the diesel internal combustion engine. However, the low oxygen concentration in the exhaust gas of the diesel internal combustion engine leads to a high rate of production of soot particles.

In an internal combustion engine that is disposed for example in a motor vehicle, exhaust gas from a combustion process of the internal combustion engine can be supplied to a new combustion process in order to reduce the pollutant emissions, in particular the nitrogen oxide emissions. Recirculating the exhaust gas and mixing the exhaust gas with fresh air for the new combustion process results in a lower production of nitrogen oxides during the combustion process. If the internal combustion engine includes a lambda probe whose measurement signal is indicative of an air/fuel ratio of the exhaust gas, then it is possible to monitor as a function of the measurement signal of the lambda probe whether an exhaust gas recirculation rate is being implemented as desired. However, providing the internal combustion engine with the lambda probe is associated with additional costs compared with an internal combustion engine without lambda probe.

SUMMARY

According to various embodiments, a method and device for monitoring an exhaust gas recirculation system of an internal combustion engine and a computer program can be provided which enable the exhaust gas recirculation system to be monitored easily and cost-effectively, in particular without a lambda probe.

According to an embodiment, in a method for monitoring an exhaust gas recirculation system of an internal combustion engine,—an actual value of an exhaust gas recirculation rate is calculated as a function of a degree of loading of a soot particle filter for filtering particles from an exhaust gas of the internal combustion engine and/or as a function of a soot content of the exhaust gas,—the calculated actual value of the exhaust gas recirculation rate is compared with a predefined setpoint value of the exhaust gas recirculation rate, and—the exhaust gas recirculation system is monitored as a function of the comparison of the actual value of the exhaust gas recirculation rate and the predefined setpoint value of the exhaust gas recirculation rate.

According to a further embodiment, the degree of loading of the soot particle filter and/or the soot content of the exhaust gas may be averaged over a predefined period of time and a mean value of the exhaust gas recirculation rate is calculated as a function of a mean value of the degree of loading of the soot particle filter and/or as a function of a mean value of the soot content of the exhaust gas, and the exhaust gas recirculation system can be monitored as a function of the mean value of the exhaust gas recirculation rate. According to a further embodiment, a nitrogen oxide content and/or a hydrocarbon content of the exhaust gas can be calculated as a function of the degree of loading of the soot particle filter and/or as a function of the soot content of the exhaust gas and as a function of the actual value of the exhaust gas mass flow, and the actual value of the exhaust gas recirculation rate can be calculated as a function of the nitrogen oxide content and/or the hydrocarbon content of the exhaust gas. According to a further embodiment, the actual value of the exhaust gas recirculation rate can be calculated as a function of a change in the degree of loading of the soot particle filter. According to a further embodiment, a difference between the actual value of the exhaust gas recirculation rate and the setpoint value of the exhaust gas recirculation rate can be calculated for the purpose of comparing the actual value of the exhaust gas recirculation rate with the setpoint value of the exhaust gas recirculation rate, and a faulty exhaust gas recirculation system can be detected if the calculated difference is greater in terms of absolute value than a predefined threshold value. According to a further embodiment, the degree of loading of the soot particle filter can be calculated as a function of a pressure difference upstream of the soot particle filter and downstream of the soot particle filter and as a function of an actual value of an exhaust gas mass flow of the internal combustion engine.

According to another embodiment, a device for monitoring an exhaust gas recirculation system of an internal combustion engine, may be embodied—for calculating an actual value of an exhaust gas recirculation rate as a function of a degree of loading of a soot particle filter for filtering particles from an exhaust gas of the internal combustion engine and/or as a function of a soot content of the exhaust gas,—for comparing the calculated actual value of the exhaust gas recirculation rate with a predefined setpoint value of the exhaust gas recirculation rate,—for monitoring the exhaust gas recirculation system as a function of the comparison of the actual value of the exhaust gas recirculation rate and the predefined setpoint value of the exhaust gas recirculation rate.

According to yet another embodiment, a computer program may comprise program instructions which, when they are executed on a computer, perform the steps as described above.

According to a further embodiment, the computer program may be embodied on a computer-readable medium.

BRIEF DESCRIPTION OF THE DRAWINGS

Exemplary embodiments are explained in more detail below with reference to schematic drawings, in which:

FIG. 3 shows a flowchart of a program for monitoring an exhaust gas recirculation system of the internal combustion engine, and FIG. 4 shows a further diagram of a hydrocarbon content of the exhaust gas as a function of the degree of loading of the soot particle filter.

Figure 1:
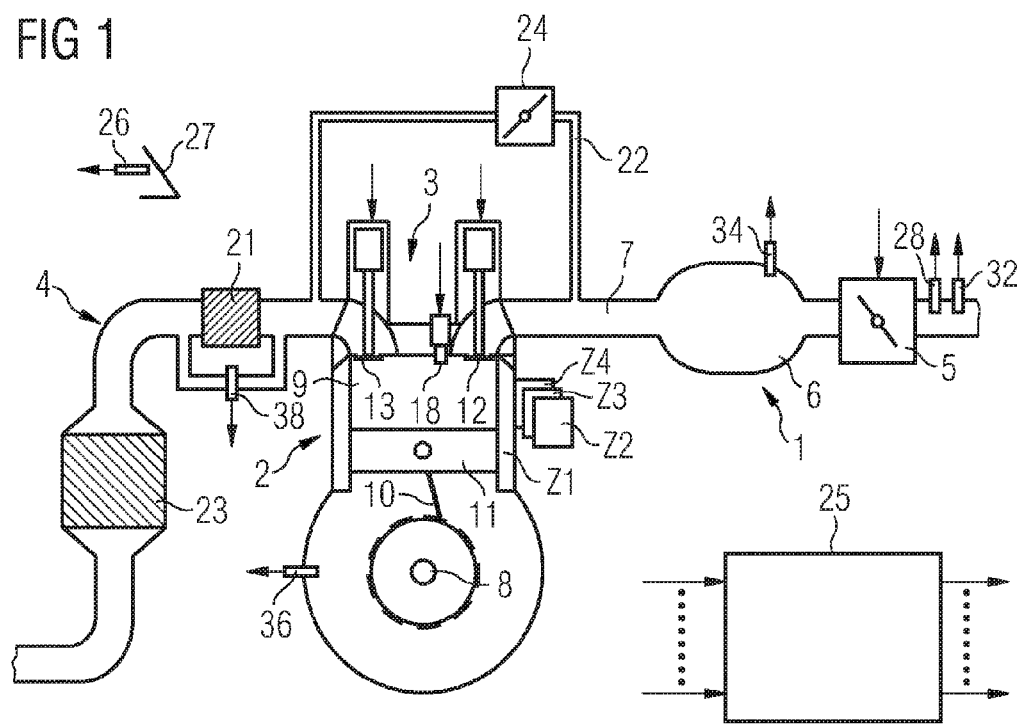
FIG. 1 shows an internal combustion engine.

Elements of identical construction or function are labeled with the same reference signs in all the figures.

DETAILED DESCRIPTION

According to a first aspect in a method and device for monitoring an exhaust gas recirculation system of an internal combustion engine, an actual value of an exhaust gas recirculation rate is calculated as a function of a degree of loading of a soot particle filter for filtering particles from an exhaust gas of the internal combustion engine and/or as a function of a soot content of the exhaust gas. The calculated actual value of the exhaust gas recirculation rate is compared with a predefined setpoint value of the exhaust gas recirculation rate. The exhaust gas recirculation system is monitored as a function of the comparison of the actual value of the exhaust gas recirculation rate and the predefined setpoint value of the exhaust gas recirculation rate.

This enables the exhaust gas recirculation system to be monitored simply and cost-effectively, since there is no requirement for a special sensor for measuring the actual value of the exhaust gas recirculation rate, a lambda probe for example. This can assist in maintaining a predefined limit value for exhaust gas emissions even without a lambda probe. The exhaust gas recirculation system can include internal and/or external exhaust gas recirculation. In addition the exhaust gas recirculation system includes all the final control elements which are actuated for the purpose of recirculating the exhaust gas, and all the sensors whose measurement signals help in determining the exhaust gas recirculation rate. The exhaust gas recirculation system can also comprise a control device and/or control software for operating the exhaust gas recirculation system. The monitoring of the exhaust gas recirculation rate leads in particular to the detection of a malfunction of the exhaust gas recirculation system or to the verification of fault-free operation of the exhaust gas recirculation system.

In an embodiment, the actual value of the exhaust gas mass flow and the degree of loading of the soot particle filter and/or the soot content of the exhaust gas are averaged over a predefined period of time. A mean value of the exhaust gas recirculation rate is calculated as a function of a mean value of the exhaust gas mass flow and as a function of a mean value of the degree of loading of the soot particle filter. The exhaust gas recirculation system is monitored as a function of the mean value of the exhaust gas recirculation rate. This can contribute toward particularly precise monitoring of the exhaust gas recirculation system. This also enables reliable monitoring of the exhaust gas recirculation system to be performed after several crankshaft angle revolutions and/or several seconds in cases where sensors whose measurement signals help in recording the actual value of the exhaust gas mass flow and/or the degree of loading of the soot particle filter are relatively imprecise.

In a further embodiment, a nitrogen oxide content and/or a hydrocarbon content of the exhaust gas are/is calculated as a function of the degree of loading of the soot particle filter and/or as a function of the soot content of the exhaust gas and as a function of the actual value of the exhaust gas mass flow. The actual value of the exhaust gas recirculation rate is calculated as a function of the nitrogen oxide content and/or the hydrocarbon content of the exhaust gas. This contributes in a simple manner toward precisely determining the exhaust gas recirculation rate. If the actual value of the exhaust gas mass flow and/or the degree of loading of the soot particle filter are/is averaged over the predefined time period, the nitrogen oxide content and/or the hydrocarbon content can also be averaged over the predefined time period.

In a further embodiment, the actual value of the exhaust gas recirculation rate is calculated as a function of a change in the degree of loading of the soot particle filter. This can contribute toward determining the exhaust gas recirculation rate particularly precisely.

In a further embodiment, a difference between the actual value of the exhaust gas recirculation rate and the setpoint value of the exhaust gas recirculation rate is calculated in order to compare the actual value of the exhaust gas recirculation rate with the setpoint value of the exhaust gas recirculation rate. A faulty exhaust gas recirculation system is detected if the calculated difference is greater in terms of absolute value than a predefined threshold value. This enables the comparison between the actual value and the setpoint value of the exhaust gas recirculation rate to be performed particularly simply.

In a further embodiment, the degree of loading of the soot particle filter is calculated as a function of a pressure difference upstream of the soot particle filter and downstream of the soot particle filter and as a function of an actual value of an exhaust gas mass flow of the internal combustion engine. This enables the degree of loading of the soot particle filter to be determined in a simple manner, in particular without a special degree-of-loading sensor. This can contribute toward cost-effective production of the internal combustion engine. The actual value of the exhaust gas mass flow can be calculated, for example, as a function of a mass air flow in an intake tract of the internal combustion engine.

According to a second aspect, a computer program comprises program instructions which, when they are executed on a computer, perform the steps of the method for monitoring an exhaust gas recirculation system.

In an embodiment, the computer program is embodied on a computer-readable storage medium.

An internal combustion engine (FIG. 1) comprises an intake tract 1, an engine block 2, a cylinder head 3 and an exhaust tract 4. The intake tract 1 preferably includes a throttle valve 5, a plenum chamber 6 and an intake runner 7 which is routed to a cylinder Z1-Z4 via an intake port into a combustion chamber 9 of the engine block 2. The engine block 2 comprises a crankshaft 8 which is coupled to the piston 11 of the cylinder Z1-Z4 via a connecting rod 10. The intake tract 1 communicates with the combustion chamber 9 as a function of a switch setting of a gas intake valve 12. The exhaust tract 4 communicates with the combustion chamber 9 as a function of a switch setting of a gas exhaust valve 13.

The internal combustion engine comprises a plurality of cylinders Z1-Z4. The internal combustion engine can, however, also comprise any arbitrary greater number of cylinders Z1-Z4. The internal combustion engine is preferably a diesel internal combustion engine and preferably disposed in a motor vehicle.

A fuel injection valve 18 is preferably disposed in the cylinder head 3. Alternatively the fuel injection valve 18 can also be disposed in the intake runner 7. If the internal combustion engine is not a diesel internal combustion engine, then preferably there is disposed in the cylinder head 3 a spark plug which projects into the combustion chamber 9.

A soot particle filter 21 and an exhaust gas catalytic converter 23 are preferably disposed in the exhaust tract 4. The exhaust tract 4 communicates with the intake tract 1 via an exhaust gas recirculation line 22 as a function of a switch setting of an exhaust gas recirculation valve 24. Exhaust gas from the exhaust tract 4 can be recirculated into the intake tract 1 through the exhaust gas recirculation line 22, with an external exhaust gas recirculation rate being predefined by means of the exhaust gas recirculation valve 24. If the internal combustion engine includes a variable valve timing of the gas intake valve 12 and/or of the gas exhaust valve 13, exhaust gas for the combustion process can be recirculated internally via the combustion chamber 9 into the combustion chamber 9 by variable control of valve timings of the gas intake valve 12 or the gas exhaust valve 13 and in this way an internal exhaust gas recirculation rate can be predefined.

A control device 25 is provided to which are assigned sensors which capture various measured variables and in each case determine the value of the measured variable. Operating variables comprise the measured variables and variables of the internal combustion engine that are derived from said measured variables. As a function of at least one of the operating variables the control device 25 determines at least one actuating variable which is then converted into one or more actuating signals for controlling the final control elements by means of corresponding actuating drives. The control device 25 can also be designated as a device for operating the internal combustion engine. In particular the control device 25 can also be designated as a device for monitoring an exhaust gas recirculation system.

The sensors are, for example, a pedal position transducer 26 which detects a position of an accelerator pedal 27, a mass air flow sensor 28 which measures a mass air flow upstream of the throttle valve 5, a temperature sensor 32 which measures an intake air temperature, an intake runner pressure sensor 34 which measures an intake runner pressure in the plenum chamber 6, a crankshaft angle sensor 36 which detects a crankshaft angle to which an engine speed of the internal combustion engine is then assigned, and/or a differential pressure sensor 38 for measuring a pressure difference between pressures upstream and downstream of the soot particle filter 21. In addition a soot particle sensor can be provided which determines a soot content of the exhaust gas.

An arbitrary subset of the aforementioned sensors can be present or additional sensors can also be provided, depending on the embodiment variant.

The final control elements are, for example, the throttle valve 5, the gas intake and gas exhaust valves 12, 13, the fuel injection valve 18 and/or the exhaust gas recirculation valve 24.

In a lean mode of operation of the internal combustion engine, less fuel is metered for a combustion process in the combustion chamber 9 than can be combusted by means of the oxygen in the combustion chamber 9. The oxygen is supplied to the combustion chamber 9 with the mass air flow via the intake tract 1. Compared with a rich mode of operation and/or a stoichiometric mode of operation of the internal combustion engine, increased concentrations of nitrogen oxides are formed during the lean mode of operation and these are then contained in the exhaust gas. The nitrogen oxides are harmful to the environment and harmful to health. As the oxygen concentration increases in the combustion chamber 9 prior to the combustion process the production of nitrogen oxides also increases. The oxygen concentration is therefore preferably set so small that preferably minimum amounts of nitrogen oxides are produced. However, the small oxygen concentration in the combustion chamber 9 prior to the combustion process can contribute to a small oxygen concentration in the exhaust gas prior to an exhaust gas aftertreatment. The small oxygen concentration of the exhaust gas promotes the production of soot particles, however.

In a lean mode of operation of the internal combustion engine more fuel is metered for the combustion process in the combustion chamber 9 than can be combusted by means of the oxygen in the combustion chamber 9. This can result in increased amounts of unburnt hydrocarbons being contained in the exhaust gas. This likewise promotes the production of soot particles.

Figure 2:
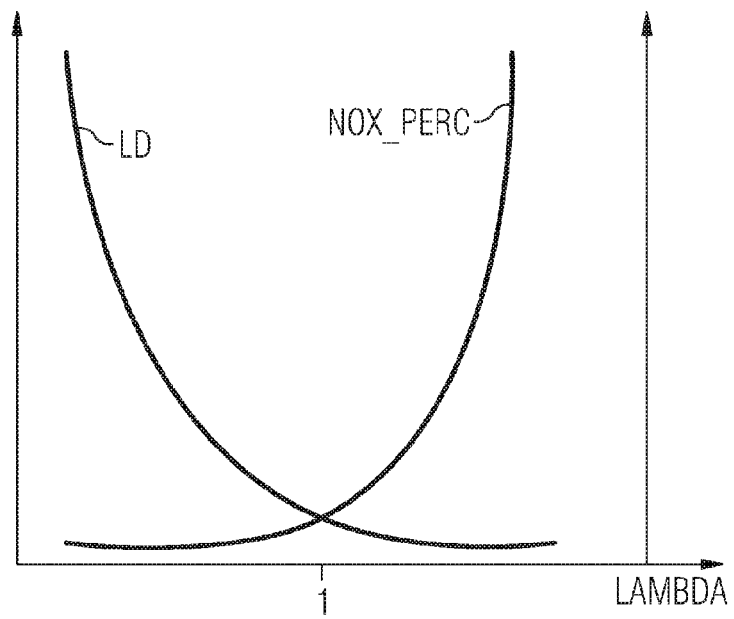
FIG. 2 shows a diagram of a degree of loading of a soot particle filter and a nitrogen oxide content of an exhaust gas of the internal combustion engine as a function of a lambda value.

A diagram (FIG. 2) represents dependencies of a degree of loading LD of the soot particle filter 21, a nitrogen oxide content NOX_PERC and a hydrocarbon content HC_PERC of an air/fuel ratio of the exhaust gas from the combustion process in the combustion chamber 9. An x-axis of the diagram is representative here of a lambda value LAMBDA which is indicative of an air/fuel ratio of the exhaust gas. The diagram can be stored, for example, as an engine operating map on a storage medium of the control device 25 such that the control device 25 can calculate the nitrogen oxide content NOX_PERC of the exhaust gas as a function of the degree of loading LD of the soot particle filter 21. For that purpose the nitrogen oxide content NOX_PERC of the exhaust gas can also be represented as a function of the degree of loading LD (FIG. 4). The engine operating map and/or where appropriate further engine operating maps can be recorded on an engine test bench for example. Alternatively a model calculation can be determined on the basis of which the nitrogen oxide content NOX_PERC of the exhaust gas can be calculated as a function of the degree of loading LD. Alternatively an engine operating map can be stored on the basis of which the nitrogen oxide content NOX_PERC can be calculated as a function of the soot content of the exhaust gas. The degree of loading LD of the soot particle filter 21 reflects the soot particle content of the exhaust gas over a long period of time, for example over a period lasting from several seconds to a few minutes. The soot particle filter 21 and the sensors for determining the degree of loading LD of the soot particle filter can thus serve as a soot content sensor for the internal combustion engine.

A further diagram can also be stored as a further engine operating map on the storage medium of the control device 25 so that the control device 25 can calculate a hydrocarbon content HC_PERC of the exhaust gas as a function of the degree of loading LD of the soot particle filter 21. For that purpose the hydrocarbon content HC_PERC of the exhaust gas can be represented as a function of the degree of loading LD. In the case of a diesel internal combustion engine a sign of a slope of a curve of the hydrocarbon content HC_PERC of the exhaust gas is regularly equal to a sign of a slope of the degree of loading LD of the soot particle filter 21 as a function of the lambda value LAMBDA. In the present context this means that the increasing degree of loading LD of the soot particle filter 21 is indicative of the increasing hydrocarbon content HC_PERC of the exhaust gas.

The position of the graphs of the hydrocarbon content HC_PERC of the exhaust gas and of the degree of loading LD of the soot particle filter 21 relative to each other and/or as a function of the lambda value LAMBDA can vary from internal combustion engine to internal combustion engine, in particular from a gasoline internal combustion engine to a diesel internal combustion engine.

A program for monitoring the exhaust gas recirculation system is preferably stored on the storage medium of the control device 25. The program is used for detecting a malfunction of the exhaust gas recirculation system or for verifying fault-free operation of the exhaust gas recirculation system. The exhaust gas recirculation system preferably comprises all the sensors and all the final control elements that are used for setting, converting and determining the exhaust gas recirculation rate, in particular the differential pressure sensor 38, the exhaust gas recirculation valve 24 in the case of external exhaust gas recirculation, and in the case of an internal exhaust gas recirculation rate the gas intake valve 12 and/or the gas exhaust valve 13 and a device for adjusting the valve opening times of the gas intake valve 12 and/or of the gas exhaust valve 13. Furthermore the exhaust gas recirculation system can at least partially include the control device 25 and/or software, in particular the program for monitoring the exhaust gas recirculation system.

The program for monitoring the exhaust gas recirculation system is preferably started in a step S1 in which variables are initialized if necessary. Preferably the program is started and executed during an idling mode of operation of the internal combustion engine.

In a step S2, a setpoint value SP_EGR of the exhaust gas recirculation rate is preferably determined. The setpoint value SP_EGR of the exhaust gas recirculation rate can be calculated for example as a function of the operating variables of the internal combustion engine such that the production of pollutants during the combustion process in the combustion chamber 9, in particular production of nitrogen oxides and/or hydrocarbons, is at a minimum. Alternatively the setpoint value SP_EGR of the exhaust gas recirculation rate can be specified simply for monitoring the exhaust gas recirculation system.

In a step S3, the degree of loading LD of the soot particle filter 21 is determined. Preferably the degree of loading LD is calculated as a function of a pressure difference PRS_DIF between the pressure upstream of the soot particle filter 21 and the pressure downstream of the soot particle filter 21, in particular as a function of the pressures that occur spatially close to the soot particle filter 21. Furthermore the degree of loading LD of the soot particle filter 21 is determined as a function of an actual value AV_EGF of an exhaust gas mass flow. The actual value AV_EGF of the exhaust gas mass flow can be calculated for example as a function of the mass air flow that is drawn in via the intake tract 1. Alternatively a sensor can be provided for determining the degree of loading LD. Alternatively or in addition, the soot content of the exhaust gas can be determined in step S3.

In a step S4, the nitrogen oxide content NOX_PERC is calculated as a function of the degree of loading LD of the soot particle filter 21, preferably with reference to the diagram. Alternatively or in addition, the hydrocarbon content HC_PERC of the exhaust gas can be calculated as a function of the degree of loading LD of the soot particle filter 21.

In a step S5, an actual value AV_EGR of the exhaust gas recirculation rate is calculated as a function of the nitrogen oxide content NOX_PERC and/or as a function of the hydrocarbon content HC_PERC of the exhaust gas. The actual value AV_EGR of the exhaust gas recirculation rate can be determined for example with the aid of a further engine operating map.

In a step S6, a difference EGR_DIF in the exhaust gas recirculation rate is calculated as a function of the actual value AV_EGR and the setpoint value SP_EGR of the exhaust gas recirculation rate, preferably with the aid of the calculation rule specified in step S6.

In a step S7, a check is carried out to determine whether the difference EGR_DIF in the exhaust gas recirculation rate is less than a predefined threshold value THD. If the condition of step S7 is met, the processing is continued in a step S9.

If the condition of step S7 is not met, the processing is continued in a step S8.

If the setpoint value SP_EGR of the exhaust gas recirculation rate is specified greater than a current value of the exhaust gas recirculation rate, and if the degree of loading LD of the soot particle filter 21 remains unchanged or increases to a lesser extent than would be expected based on the increase in the exhaust gas recirculation rate, an error message ERROR is generated in a step S8, said error message being indicative of the fact that the setpoint value SP_EGR of the exhaust gas recirculation rate has not been implemented as desired and that an increase in nitrogen oxide emissions is likely. In particular the error message ERROR is then indicative of the fact that less exhaust gas than desired has been recirculated.

If after the setpoint value SP_EGR of the exhaust gas recirculation rate has been specified, the actual value AV_EGR is far greater than expected, this being detected due to a higher than expected degree of loading LD of the soot particle filter 21, this can be caused by the increased hydrocarbon content HC_PERC of the exhaust gas and similarly indicates an incorrect implementation of the setpoint value SP_EGR of the exhaust gas recirculation rate. As a function thereof the error message ERROR can likewise be generated, then being indicative of the faulty operation of the exhaust gas recirculation system. In particular the error message ERROR is then indicative of the fact that more exhaust gas than desired has been recirculated and that increased amounts of hydrocarbons are being emitted.

In step S9, the program for monitoring the exhaust gas recirculation system can be terminated. Alternatively the program for monitoring the exhaust gas recirculation system can be executed at regular intervals during the operation of the internal combustion engine.

Steps S1 to S9 of the program for monitoring the exhaust gas recirculation system are preferably translated into computer-readable program instructions and stored on a medium, the storage medium of the control device 25 for example. The program can also be designated as a computer program. The control device 25 can also be designated as a computer.

The invention is not limited to the cited exemplary embodiments. For example, a change in the degree of loading LD of the soot particle filter 21 can be determined and the exhaust gas recirculation rate can be calculated as a function of the change in the degree of loading of the soot particle filter 21. Furthermore a mean value of the degree of loading LD of the soot particle filter 21 can be calculated as a function of the degree of loading LD of the soot particle filter 21 and a mean value of the exhaust gas recirculation rate can be calculated as a function of the mean value of the degree of loading LD of the soot particle filter 21. The exhaust gas recirculation system can then be monitored as a function of the calculated mean values. This is particularly advantageous when at least one of the sensors for determining the exhaust gas recirculation rate, the differential pressure sensor 38 for example, measures the pressure difference PRS_DIF too imprecisely, with the result that no immediate calculation of the actual value AV_EGR of the exhaust gas recirculation rate is possible.

The program for monitoring the exhaust gas recirculation system can also be subdivided into a plurality of subprograms. The program for monitoring the exhaust gas recirculation system can also be implemented in a higher-ranking program.

What is claimed is:

1. A method for monitoring an exhaust gas recirculation system of an internal combustion engine, comprising the steps:
   determining a soot content comprising at least of one of (a) a degree of loading of a soot particle filter for filtering particles from an exhaust gas of the internal combustion engine and (b) a soot content of the exhaust gas,
   determining at least one of a nitrogen oxide content and a hydrocarbon content of the exhaust gas based on the determined soot content,
   a processor calculating an actual value of an exhaust gas recirculation rate as a function of at least one of the nitrogen oxide content and the hydrocarbon content of the exhaust gas,
   the processor comparing the calculated actual value of the exhaust gas recirculation rate with a predefined setpoint value of the exhaust gas recirculation rate, and
   the processor monitoring the exhaust gas recirculation system as a function of the comparison of the actual value of the exhaust gas recirculation rate and the predefined setpoint value of the exhaust gas recirculation rate.

2. The method according to claim 1, wherein the determined soot content is averaged over a predefined period of time and wherein a mean value of the exhaust gas recirculation rate is calculated as a function of the averaged soot content, and wherein the exhaust gas recirculation system is monitored as a function of the mean value of the exhaust gas recirculation rate.

3. The method according to claim 1, wherein the actual value of the exhaust gas recirculation rate is calculated as a function of a change in the degree of loading of the soot particle filter.

4. The method according to claim 1, wherein a difference between the actual value of the exhaust gas recirculation rate and the setpoint value of the exhaust gas recirculation rate is calculated for the purpose of comparing the actual value of the exhaust gas recirculation rate with the setpoint value of the exhaust gas recirculation rate, and wherein a faulty exhaust gas recirculation system is detected if an absolute value of the calculated difference is greater than a predefined threshold value.

5. A device for monitoring an exhaust gas recirculation system of an internal combustion engine, wherein the device is configured:
   to determine a soot content comprising at least of one of (a) a degree of loading of a soot particle filter for filtering particles from an exhaust gas of the internal combustion engine and (b) a soot content of the exhaust gas;
   to determine at least one of a nitrogen oxide content and a hydrocarbon content of the exhaust gas based on the determined soot content,
   to calculate an actual value of an exhaust gas recirculation rate as a function of at least the determined soot content,
   to compare the calculated actual value of the exhaust gas recirculation rate with a predefined setpoint value of the exhaust gas recirculation rate,
   to monitor the exhaust gas recirculation system as a function of the comparison of the actual value of the exhaust gas recirculation rate and the predefined setpoint value of the exhaust gas recirculation rate.

6. The device according to claim 5, wherein the device is further operable to average the determined soot content over a predefined period of time and to calculate a mean value of the exhaust gas recirculation rate as a function of the averaged value of the determined soot content, and to monitor the exhaust gas recirculation system as a function of the mean value of the exhaust gas recirculation rate.

7. The device according to claim 5, wherein the device is further operable to calculate the actual value of the exhaust gas recirculation rate as a function of a change in the degree of loading of the soot particle filter.

8. The device according to claim 5, wherein the device is further operable to calculate a difference between the actual value of the exhaust gas recirculation rate and the setpoint value of the exhaust gas recirculation rate is calculated for the purpose of comparing the actual value of the exhaust gas recirculation rate with the setpoint value of the exhaust gas recirculation rate, and to detect a faulty exhaust gas recirculation system if the calculated difference is greater in terms of absolute value than a predefined threshold value.

9. A computer program product comprising a non-transitory computer readable medium storing program instructions which, when they are executed on a computer, perform the steps of:
   calculating an actual value of an exhaust gas recirculation rate as a function at least of the determined soot content as a function of at least one of a degree of loading of a soot particle filter for filtering particles from an exhaust gas of the internal combustion engine and a soot content of the exhaust gas,
   calculating a difference between the calculated actual value of the exhaust gas recirculation rate and a predefined setpoint value of the exhaust gas recirculation rate, and
   monitoring the exhaust gas recirculation system as a function of the calculated difference between the actual value of the exhaust gas recirculation rate and the predefined setpoint value of the exhaust gas recirculation rate, and
   detecting a fault associated with the exhaust gas recirculation system if an absolute value of the calculated difference is greater than a predefined threshold value.

10. The computer program product according to claim 9, wherein the determined soot content is averaged over a predefined period of time and wherein a mean value of the exhaust gas recirculation rate is calculated as a function of the averaged value of the determined soot content, and wherein the exhaust gas recirculation system is monitored as a function of the mean value of the exhaust gas recirculation rate.

11. The computer program product according to claim 9, wherein at least one of a nitrogen oxide content and a hydrocarbon content of the exhaust gas is calculated as a function of the determined soot content and as a function of the actual value of the exhaust gas mass flow, and wherein the actual value of the exhaust gas recirculation rate is calculated as a function of at least one of the nitrogen oxide content and the hydrocarbon content of the exhaust gas.

12. The computer program product according to claim 9, wherein the actual value of the exhaust gas recirculation rate is calculated as a function of a change in the degree of loading of the soot particle filter.

13. The computer program product according to claim 9, wherein the degree of loading of the soot particle filter is calculated as a function of a pressure difference upstream of the soot particle filter and downstream of the soot particle filter and as a function of an actual value of an exhaust gas mass flow of the internal combustion engine.

14. A method for monitoring an exhaust gas recirculation system of an internal combustion engine, comprising the steps:
   a processor calculating an actual value of an exhaust gas recirculation rate as a function of at least one of a degree of loading of a soot particle filter for filtering particles from an exhaust gas of the internal combustion engine and a soot content of the exhaust gas, the processor calculating a difference between the calculated actual value of the exhaust gas recirculation rate and a predefined setpoint value of the exhaust gas recirculation rate, the processor monitoring the exhaust gas recirculation system as a function of the calculated difference between the actual value of the exhaust gas recirculation rate and the predefined setpoint value of the exhaust gas recirculation rate, and the processor detecting a faulty exhaust gas recirculation system if an absolute value of the calculated difference is greater than a predefined threshold value.

15. A device for monitoring an exhaust gas recirculation system of an internal combustion engine, wherein the device is configured:

to calculate an actual value of an exhaust gas recirculation rate as a function of at least one of a degree of loading of a soot particle filter for filtering particles from an exhaust gas of the internal combustion engine and a soot content of the exhaust gas, to calculate a difference between the calculated actual value of the exhaust gas recirculation rate and a predefined setpoint value of the exhaust gas recirculation rate, to monitor the exhaust gas recirculation system as a function of the calculated difference between the actual value of the exhaust gas recirculation rate and the predefined setpoint value of the exhaust gas recirculation rate, and to detect a faulty exhaust gas recirculation system if an absolute value of the calculated difference is greater than a predefined threshold value.

16. A method for monitoring an exhaust gas recirculation system of an internal combustion engine, comprising the steps:

determining a degree of loading of a soot particle filter for filtering particles from an exhaust gas of the internal combustion engine, a processor calculating an actual value of an exhaust gas recirculation rate as a function at least of the determined degree of loading of the soot particle filter, the processor comparing the calculated actual value of the exhaust gas recirculation rate with a predefined setpoint value of the exhaust gas recirculation rate, and the processor monitoring the exhaust gas recirculation system as a function of the comparison of the actual value of the exhaust gas recirculation rate and the predefined setpoint value of the exhaust gas recirculation rate.

17. The method according to claim 16, wherein the degree of loading of the soot particle filter is calculated as a function of a pressure difference upstream of the soot particle filter and downstream of the soot particle filter and as a function of an actual value of an exhaust gas mass flow of the internal combustion engine.

18. A device for monitoring an exhaust gas recirculation system of an internal combustion engine, wherein the device is configured:

to determine a degree of loading of a soot particle filter for filtering particles from an exhaust gas of the internal combustion engine, to calculate an actual value of an exhaust gas recirculation rate as a function at least of the determined degree of loading of the soot particle filter, to compare the calculated actual value of the exhaust gas recirculation rate with a predefined setpoint value of the exhaust gas recirculation rate, and to monitor the exhaust gas recirculation system as a function of the comparison of the actual value of the exhaust gas recirculation rate and the predefined setpoint value of the exhaust gas recirculation rate.

19. The device according to claim 18, wherein the device is further operable to calculate the degree of loading of the soot particle filter as a function of a pressure difference upstream of the soot particle filter and downstream of the soot particle filter and as a function of an actual value of an exhaust gas mass flow of the internal combustion engine.

\* \* \* \* \*